(12) United States Patent
Shiroma (10) Patent No.: US 11,413,696 B2
(45) Date of Patent: Aug. 16, 2022

(54) INDEXABLE CUTTING TOOL

(71) Applicant: TUNGALOY CORPORATION, Fukushima (JP)

(72) Inventor: Hikaru Shiroma, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 341 days.

(21) Appl. No.: 16/736,056

(22) Filed: Jan. 7, 2020

(65) Prior Publication Data

US 2020/0230726 A1    Jul. 23, 2020

(30) Foreign Application Priority Data

Jan. 17, 2019 (JP) .............................. JP2019-006135
Nov. 12, 2019 (JP) .............................. JP2019-204605

(51) Int. Cl.
*B23G 5/18* (2006.01)

(52) U.S. Cl.
CPC .......... *B23G 5/18* (2013.01); *B23C 2200/362* (2013.01); *B23G 2200/10* (2013.01)

(58) Field of Classification Search
CPC ................. B23G 5/18; B23G 2200/10; B23C 2200/206; B23C 2200/361; B23C 2200/362; B23C 2210/165; B23C 2210/16; B23B 2205/04; B23B 2205/045; B23B 2200/3618

See application file for complete search history.

(56) References Cited

U.S. PATENT DOCUMENTS

| | | | |
|---|---|---|---|
| 4,875,812 A | 10/1989 | Haque et al. | |
| 2006/0045633 A1* | 3/2006 | Morgulis | ................. B23G 5/18 |
| 2012/0114435 A1 | 5/2012 | Park | |
| 2015/0283619 A1* | 10/2015 | Muthuchidambaram et al. | ......... B23B 27/16 |

FOREIGN PATENT DOCUMENTS

| | | |
|---|---|---|
| EP | 0 037 554 A1 | 10/1981 |
| JP | H07-015204 U | 3/1995 |
| JP | H09300110 A | 11/1997 |
| JP | 2006-068898 A | 3/2006 |
| JP | 2010502462 A | 1/2010 |
| JP | 2012-531317 A | 12/2012 |
| JP | 2013056396 A | 3/2013 |

* cited by examiner

*Primary Examiner* — Boyer D Ashley
*Assistant Examiner* — Reinaldo A Del Vargas Rio
(74) *Attorney, Agent, or Firm* — Studebaker & Brackett PC (57) ABSTRACT

An indexable cutting tool stably clamps cutting inserts and prevents contact between head parts of fasteners and workpieces. Recesses with a bottom are formed in an upper surface of a cutting insert. Part of an inner wall surface of each recess curves and bulges toward a center axis of the recess. The recess is divided into first to fourth regions by a first imaginary reference plane parallel to a rotation axis of a body, and a second imaginary reference plane perpendicular to the rotation axis. The second region is on a center side and on a proximal side of the body. A tapered surface of a fastener contacts the curved surface within the second region. A center axis of the fastener inclines so a head part opposite a distal end part is closer to the center side and to the proximal side of the body than the distal end part.

4 Claims, 14 Drawing Sheets

INDEXABLE CUTTING TOOL

CROSS-REFERENCES TO RELATED APPLICATIONS

This application relates to and claims priority from Japanese Patent Application No. 2019-006135, filed on Jan. 17, 2019 and Japanese Patent Application No. 2019-204605, filed on Nov. 12, 2019, the entire disclosure of which are incorporated herein by reference.

BACKGROUND

Field

The present invention relates to an indexable cutting tool, and more particularly to an indexable milling tool used with a thread cutting insert.

Description of Related Art

Milling tools with removable tips used for cutting threads have been known before. Patent Publication JP-A-2006-068898, for example, discloses a thread milling tool with an exchangeable cutting insert. The cutting insert is formed in a substantially rectangular shape, and cutting edges configured suitably for the shape of internal or external threads to be cut are provided in a side edge portion along a longer side of the rectangle. The cutting tool is attached to the body of a milling tool, and this milling tool itself is rotated around a rotation axis to cut threads in a workpiece.

One means of fixedly attaching a thread cutting insert to a body, as disclosed for example in Patent Publication JP-A-2006-068898, is by using an axial force of a bolt inserted in a recess formed in the upper surface of the cutting insert to apply a force to the cutting insert so that it is secured.

SUMMARY

With the method mentioned above wherein a bolt is inserted in the recess to secure the cutting insert, the axial force of the bolt may not be sufficiently applied to the attached cutting insert depending on the precision of the distal end portion of the bolt or the recess formed to the insert, or the position precision of the cutting insert may be adversely affected by variation in the contact point between the bolt and the recess. With the method wherein the bolt is inserted diagonally into the recess, in particular, there can easily be formed a gap between the bolt and the recess, in which case hardly any axial force can be applied to the cutting insert.

Moreover, since the recess is relatively shallow, the head of the bolt can readily pop out of the recess as compared to a fastening screw passed through a through hole in the insert. There is therefore the possibility that the head of a popping out screw may cross the rotation trajectory of the cutting edges and may contact the material being cut (workpiece) during the cutting.

In view of the problem described above, the present invention was developed to solve this. Namely, an object of the present invention is to provide an indexable cutting tool that allows for stable clamping of cutting inserts and prevents contact between head parts of fastening members and workpieces.

An indexable cutting tool according to one aspect of the present invention includes a body rotatable around a rotation axis, a cutting insert exchangeably attached to the body, and a fastening member that fixes the cutting insert to the body. The fastening member has a distal end part formed with a tapered surface. The cutting insert includes an upper surface and a lower surface, each formed in a rectangular shape with a pair of longer sides and a pair of shorter sides, and a side surface connecting the upper surface and the lower surface. A cutting edge is formed along in an intersecting edge portion where the upper surface and the side surface intersect along the longer side. The upper surface is formed with a recess having a bottom. At least part of an inner wall surface of the recess is a curved surface bulged toward a center axis of the recess. When the recess is divided into four, first to fourth, regions by a first imaginary reference plane containing the center axis of the recess and parallel to the rotation axis of the body and a second imaginary reference plane containing the center axis of the recess and perpendicular to the rotation axis of the body, the second region is located on a center side closer to the rotation axis of the body and on a proximal side of the body in the recess. The tapered surface of the fastening member makes contact with the curved surface within the second region. The center axis line of the fastening member is inclined such that a head part opposite from the distal end part is located closer to the center side and to the proximal side of the body than the distal end part.

According to this aspect, the center axis line of the fastening member is inclined such that the head part of the fastening member is tilted away from the cutting edge. As the head part and the cutting edge are more spaced away from each other, the head part is less likely to contact the workpiece. The tapered surface transmits the axial force of the fastening member to the cutting insert in oblique sliding contact with the curved surface, so that the cutting insert is firmly attached to the body. Thus an indexable cutting tool that allows for stable clamping of cutting inserts and prevents contact between head parts of fastening members and workpieces can be provided.

In the above aspect, the indexable cutting tool has a plurality of recesses, wherein, preferably, a center axis line of a first fastening member inserted in the recess closest to a proximal end of the cutting insert and the first imaginary reference plane make an angle that is smaller than an angle made by a center axis line of a second fastening member inserted in the recess closest to a distal end of the cutting insert and the first imaginary reference plane.

According to this aspect, the center axis lines of the fastening members on the proximal side and on the distal side of the cutting insert are inclined in different directions. Since the direction in which the distal end part of the fastening member presses the recess of the cutting insert is slightly displaced, the cutting insert can be pressed against the body from several directions, so that the cutting insert can be clamped more stably. The angle between the center axis line and the first imaginary reference plane is determined as a complementary angle of the angle made by the direction vector of the center axis line and the normal line vector of the first imaginary reference plane. Similarly, the angle between the center axis line and the second imaginary reference plane is determined as a complementary angle of the angle made by the direction vector of the center axis line and the normal line vector of the second imaginary reference plane.

In the above aspect, the cutting insert of the indexable cutting tool may have a cutting edge for cutting threads.

According to this aspect, the substantially rectangular cutting insert can be stably and reliably clamped, which is favorable for cutting threads.

The indexable cutting tool according to the present invention allows for more stable clamping of the cutting insert than before. Namely, the cutting insert can be secured more firmly. Moreover, the indexable cutting tool according to the present invention allows for stable cutting even though it adopts a clamping method wherein the cutting insert is secured by pressure applied by a fastening member in the recess of the cutting insert, since the distal end part of the fastening member does not overlap the rotation trajectory of the cutting edge.

DETAILED DESCRIPTION

One embodiment of the present invention will be described below with reference to the drawings. Components given the same reference numerals in discrete drawings have the same or similar configuration. The indexable cutting tool 10 in various embodiments of the present invention (hereinafter referred to simply as "cutting tool 10") includes a fastening screw 40 having a radially reducing tapered surface 41, and a cutting insert 20 with a recess 23 having a curved surface 232 bulged toward the center. The center axis line C1 of the fastening screw 40 is inclined such that a head part 42 of the fastening screw 40 is located closer to the center side and to a proximal side of a body 30 than a distal end part of the fastening screw 40. A contact point X between the tapered surface 41 of the fastening screw 40 and the curved surface 232 of the cutting insert 20 is positioned inside a second region 52 of the recess 23 that is located closer to the center side and to the proximal side of the body 30 than other regions 52, 53, and 54 of the recess 23 (see FIG. 9 and FIG. 10).

Since the head part 42 of the fastening screw 40 is oriented away from cutting edges 21, the head part 42 is less likely to come into contact with a workpiece. As the tapered surface 41 transmits the axial force of the fastening screw 40 to the cutting insert 20 in oblique sliding contact with the curved surface 232, the cutting insert 20 is firmly attached to the body 30. Each configuration will be described in more detail below with reference to FIG. 1 to FIG. 11.

Figure 1:
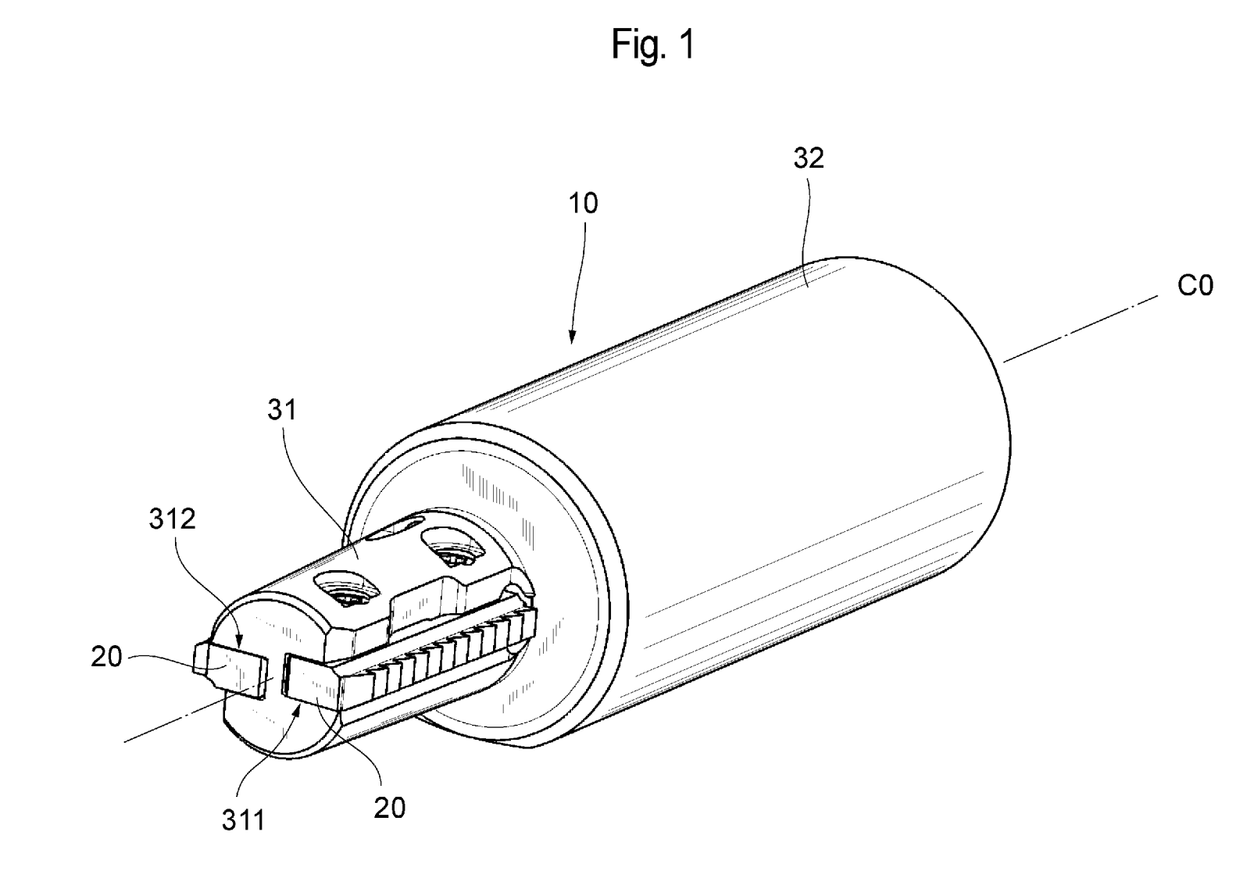
FIG. 1 is a perspective view of an indexable cutting tool according to one embodiment of the present invention.
Figure 2:
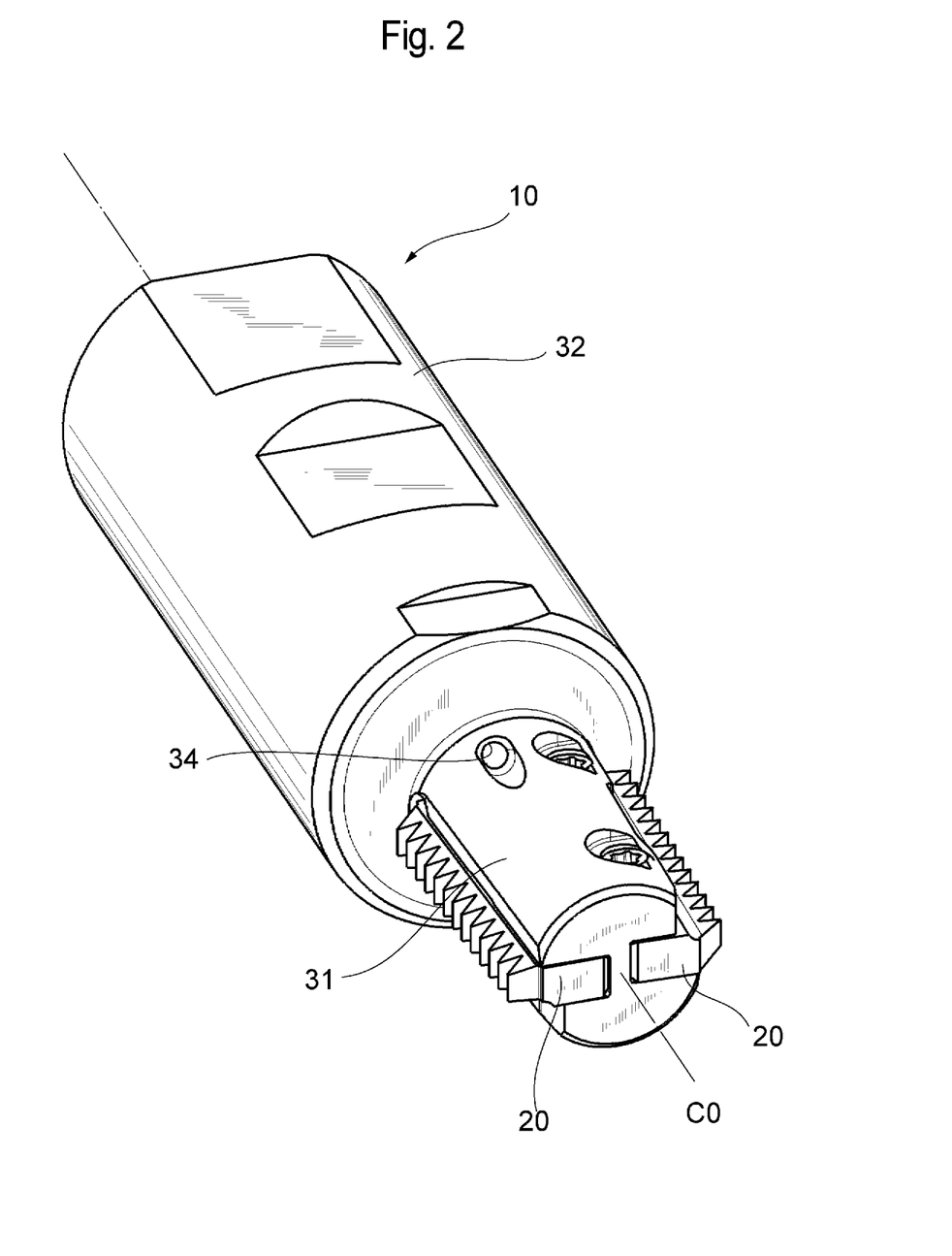
FIG. 2 is a perspective view of the cutting tool shown in FIG. 1 seen from a different angle.

FIG. 1 is a perspective view of the cutting tool 10 according to one embodiment of the present invention, and FIG. 2 is a perspective view of the cutting tool 10 seen from a different angle from FIG. 1. As shown in FIG. 1 and FIG. 2, the indexable cutting tool 10 includes two substantially rectangular cutting inserts 20, a body 30 for holding the cutting inserts 20, and fastening members (e.g., fastening screws 40) for securing the cutting inserts 20 to the body 30. The number of cutting inserts 20 is not limited to that of the illustrated example, and may be one, or three or more.

Figure 3:
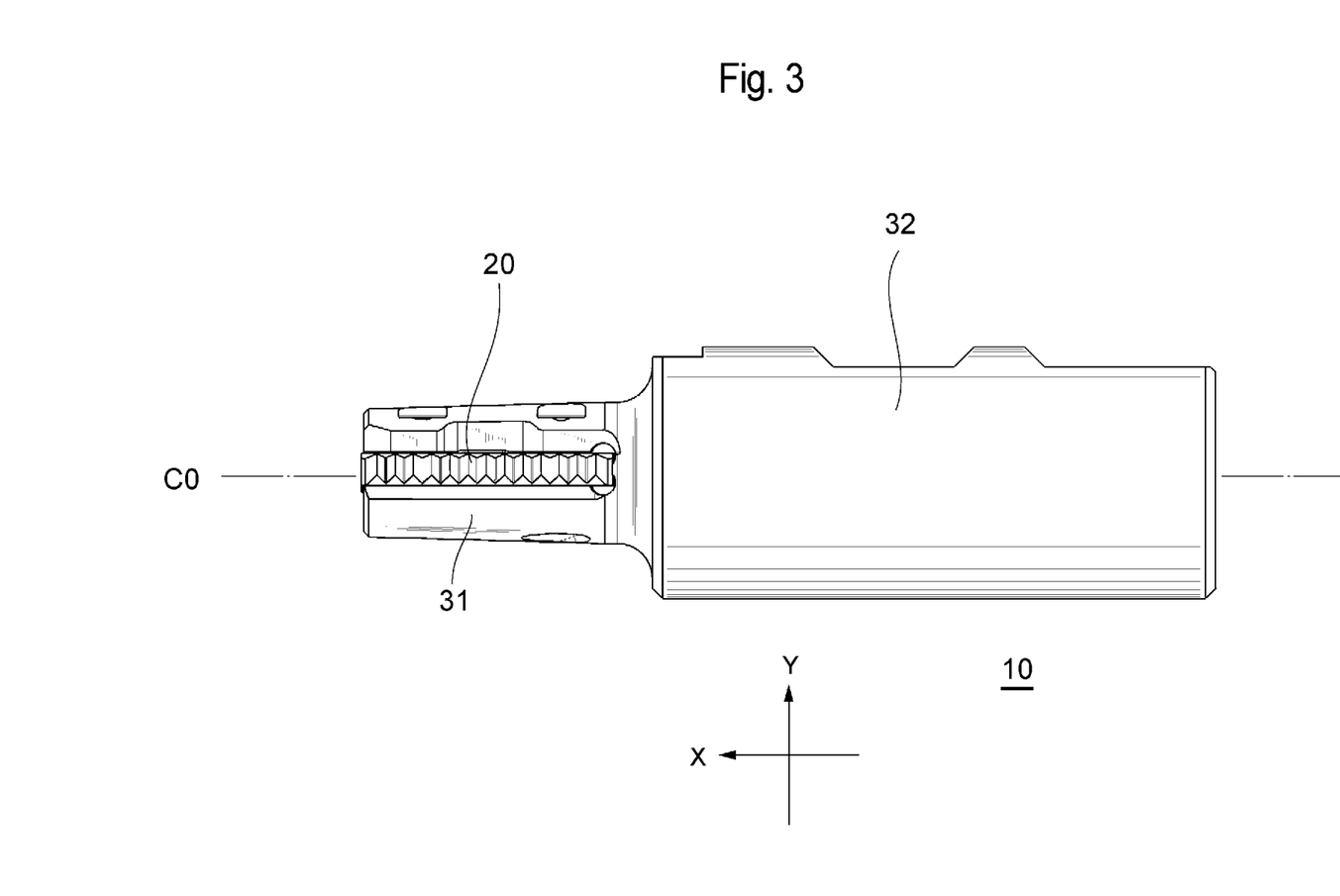
FIG. 3 is a front view of the cutting tool shown in FIG. 1.
Figure 4:
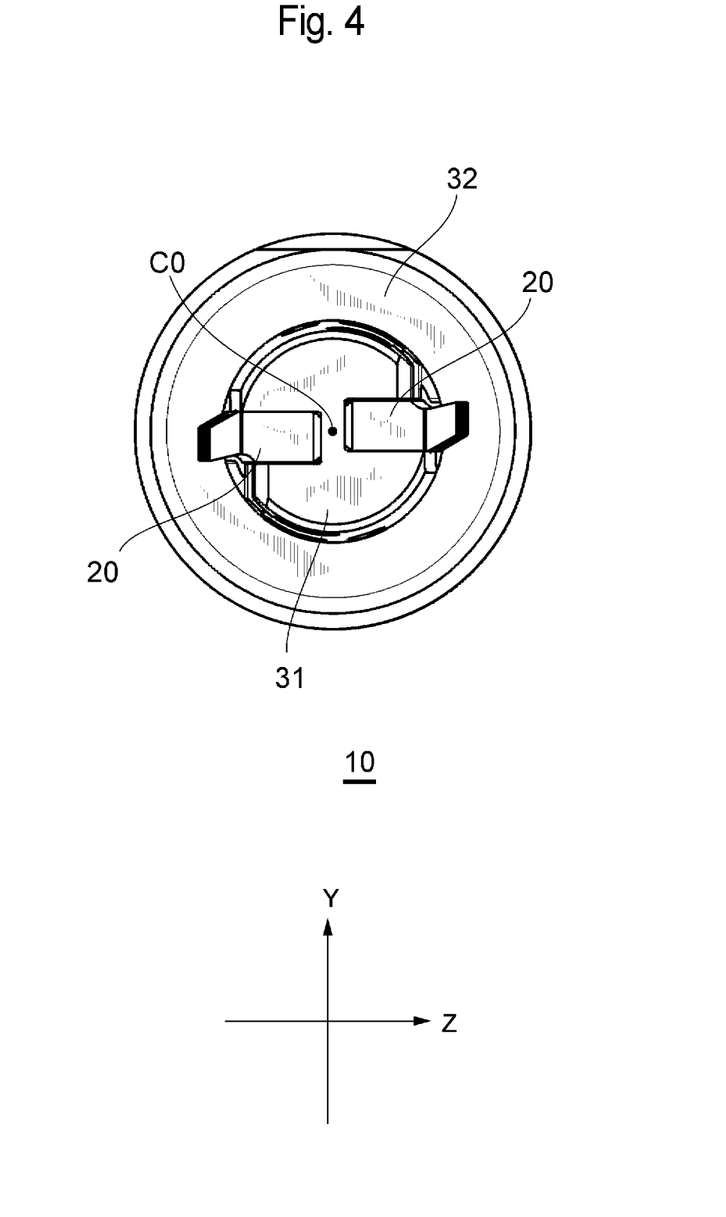
FIG. 4 is a left side view of the cutting tool shown in FIG. 1.

FIG. 3 is a front view of the cutter tool 10 shown in FIG. 1, and FIG. 4 is a left side view of the cutter tool 10 shown in FIG. 1. As shown in FIG. 3 and FIG. 4, in the following description, for the sake of convenience, an axial line parallel to the rotation axis C0 of the body 30 is defined as X axis, an axis perpendicular to X axis as well as to a bottom surface 311a of a tip seat 311 to be described later is defined as Y axis, and an axis perpendicular to X axis and parallel to the bottom surface 311a of the tip seat 311 is defined as Z axis.

When one object is located closer to the arrow head of the X axis than another object, it is described to be "closer to the distal side", while when it is located closer to the opposite side from the arrow head, it is described to be "closer to the rear side". When one object is located closer to the arrow head of the Y axis than another object, it is described to be "located above", while when it is located closer to the opposite side from the arrow head, it is described to be "located below". When one object is located closer to an origin point (e.g., rotation axis C0 of the body 30) than another object in the Y-Z plane, it is described to be "located on the center side", while when it is located away from the origin point, it is described to be "located on the peripheral side".

The body 30 has a first cylindrical part 31 in a cylindrical form, and a second cylindrical part 32 having a larger diameter than the first cylindrical part 31 and connected to the rear end of the first cylindrical part 31. The first cylindrical part 31 is formed with two tip seats 311 and 312 for the cutting inserts 20 to fit in. The tip seats 311 and 312 are slots having a substantially U-shape cross-section and formed generally over the entire length of the first cylindrical part 31. One end of the tip seats 311 and 312 extends as far as to the end face of the first cylindrical part 31, as well as to the outer circumferential surface of the body 30. Namely, the two tip seats 311 and 312 open in the distal end face and outer circumferential surface of the body 30. The cutting tool 10 has 180° rotational symmetry in all its features including the two tip seats 311 and 312. Therefore, the configuration of one of the tip seats will be described in detail as a representative of both and repeated depiction of the configuration of the other tip seat will be omitted.

The configuration of the tip seat 311 will now be described in detail. The tip seat 311 is made up of a bottom surface 311a that forms a part abutted with the cutting insert 20, a circumferential restricting wall 311b located on the center side of the body 30 and extending perpendicularly to the bottom surface 311a, a normal line of its wall surface being oriented along the Z axis, an axial restricting wall 311c located on the rear side of the body 30 and extending perpendicularly to the bottom surface 311a, a normal line of its wall surface being oriented along the X axis, and a top wall 311d located above the bottom surface 311a and connected to the circumferential restricting wall 311b and axial restricting wall 311c.

A relief (recess) is formed at the joint between the bottom surface 311a and the axial restricting wall 311c to prevent part of a side edge portion of the cutting insert 20 (shorter side 222 and its vicinity of a lower surface 22 to be described later) from interfering with the joint when the cutting insert 20 is attached. Similarly, a relief is formed at the joint between the top surface 311d and the axial restricting wall 311c to prevent part of a side edge portion of the cutting insert 20 (shorter side 242 and its vicinity of an upper surface 24 to be described later) from interfering with the joint.

In a central part of the circumferential restricting wall 311b is formed a hollow 35. By forming the hollow 35, the contact point between the cutting insert 20 and the circumferential restricting wall 311b can be limited to the distal side or rear side, rather than at the center, of the circumferential restricting wall 311b, where stable clamping is hard to achieve.

Figure 5:
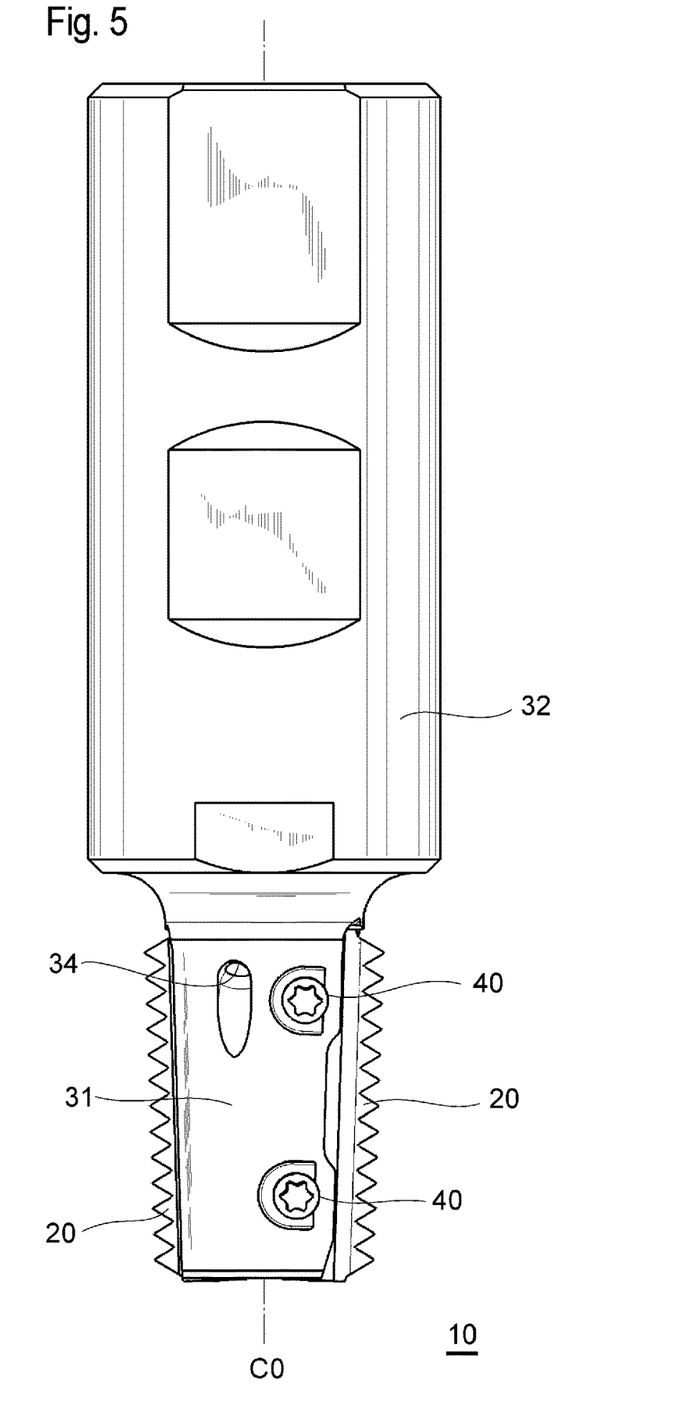
FIG. 5 is a plan view of the cutting tool shown in FIG. 1.
Figure 6:
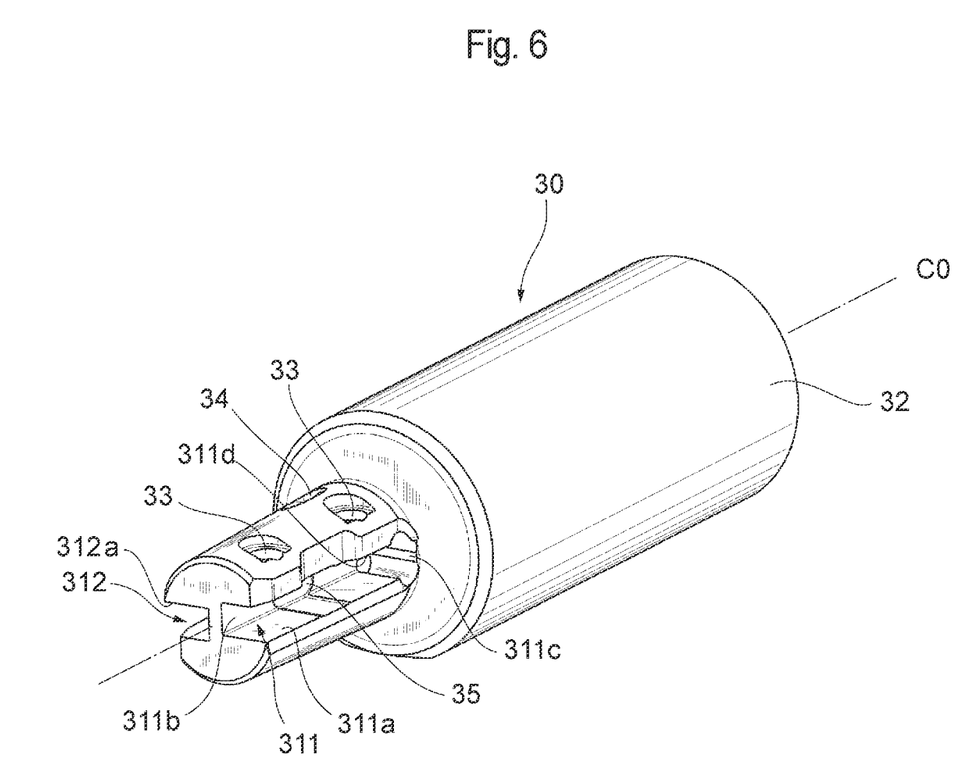
FIG. 6 is a perspective view of the cutting tool shown in FIG. 1 in a condition in which cutting inserts have been removed.

FIG. 5 is a plan view of the cutter tool 10 shown in FIG. 1, and FIG. 6 is a perspective view of the cutter tool 10 shown in FIG. 1, illustrating a condition where the cutting inserts have been removed. As shown in FIG. 5 and FIG. 6, two through holes 33 are formed in the top wall 311d. Fastening screws 40 are passed through these through holes 33, so that the fastening screws 40 press and fix the cutting insert 20 set in the tip seat 311 against the bottom surface 311a.

A jet port 34 for a coolant for cooling the cutting insert 20 is formed near the rearmost one of the through holes 33 formed in the first cylindrical part 31. The second cylindrical part 32 is a portion gripped by a machine tool (not shown).

Figure 7A:
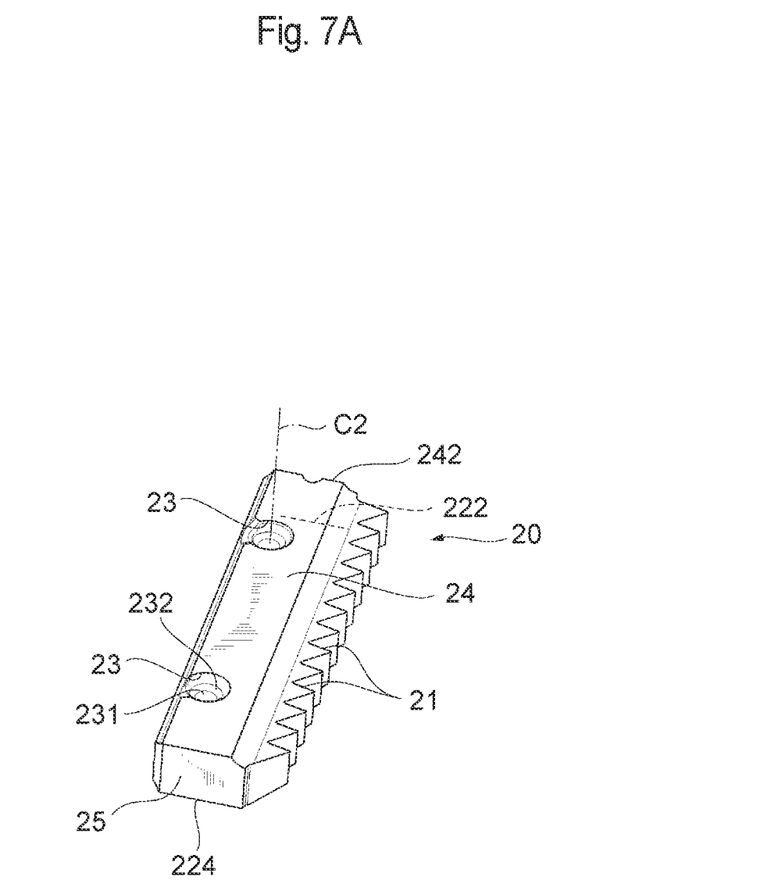
FIG. 7A is a perspective view of a cutting insert according to this embodiment.
Figure 7B:
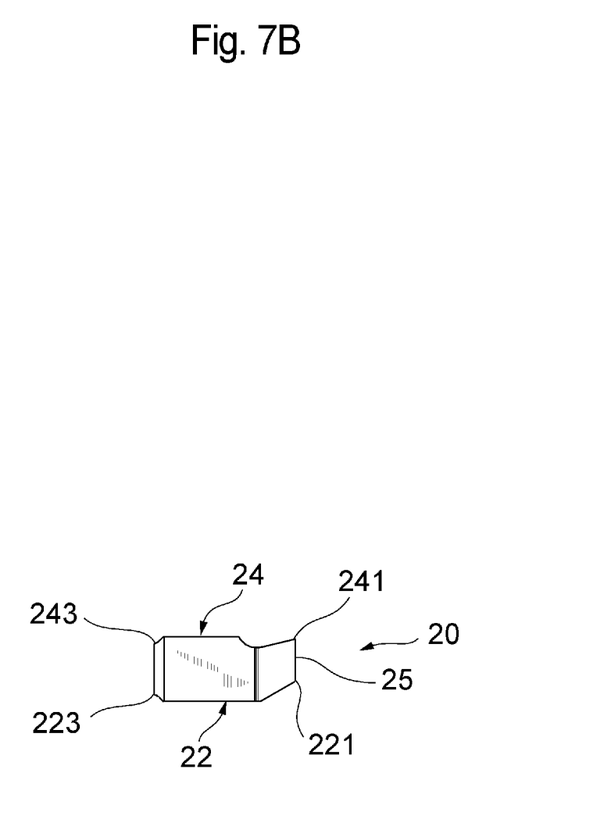
FIG. 7B is a front view of the cutting insert according to this embodiment.
Figure 7C:
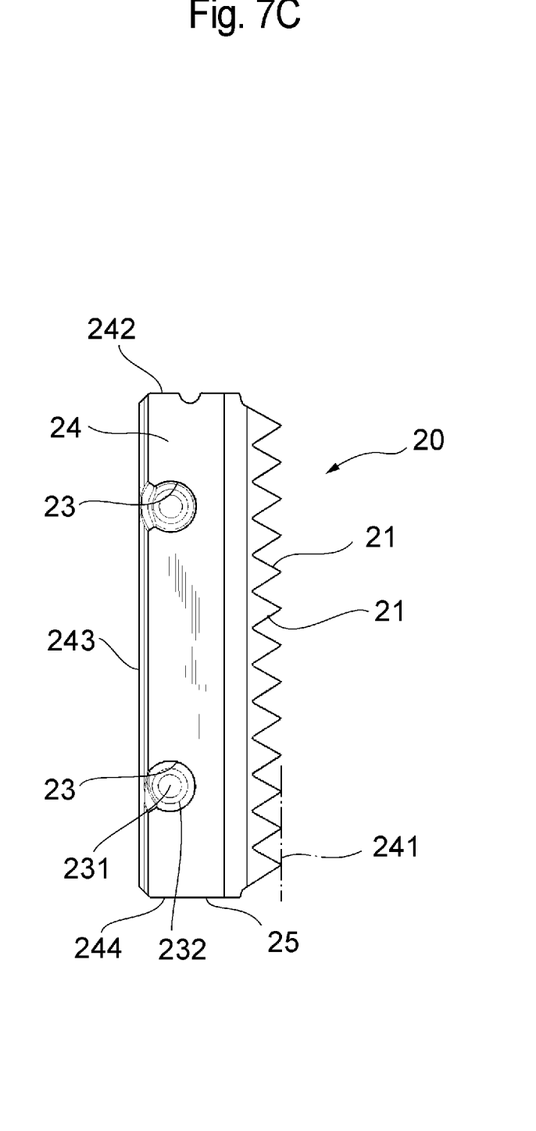
FIG. 7C is a plan view of the cutting insert according to this embodiment.

The cutting insert 20 has cutting edges 21 where multiple crests and roots are alternately formed corresponding to a desired internal or external thread shape in a side edge portion along one longer side 241 alone, i.e., only along the longer side 241, out of the side edge portions (241, 242, 243, and 244) substantially forming a rectangle. FIG. 7A is a perspective view of the cutting insert 20, FIG. 7B is a front view of the cutting insert 20, and FIG. 7C is a plan view of the cutting insert 20. As shown in FIG. 7B, the rake surface connecting to the cutting edge 21 has a positive rake angle. The cutting insert 20 abuts on the circumferential restricting wall 311b and axial restricting wall 311c when attached to the tip seat 311.

The cutting insert 20 has an upper surface 24, a lower surface 22 opposite the upper surface 24, and side surfaces 25 connecting the upper surface 24 and lower surface 22. The upper surface 24 has a substantially rectangular shape with a pair of longer sides 241 and 243 and a pair of shorter sides 242 and 244. Similarly, the lower surface 22 has a substantially rectangular shape with a pair of longer sides 221 and 223 and a pair of shorter sides 222 and 224.

In the following description, the four sides 241, 242, 243, and 244 of the upper surface 24 may be collectively referred to as side edge portions of the upper surface 24, and the four sides 221, 222, 223, and 224 of the lower surface 22 may be collectively referred to as side edge portions of the lower surface 22. The longer sides 241 and 243 are the longer side edge portions of the upper surface 24, and the shorter sides 242 and 244 are the shorter side edge portions of the upper surface 24. Similarly, the longer sides 221 and 223 are the longer side edge portions of the lower surface 22, and the shorter sides 222 and 224 are the shorter side edge portions of the lower surface 22.

The lower surface 22 is the contact surface that abuts on the bottom surface 311a of the tip seat 311. The upper surface 24 is formed with recesses 23 for the fastening screws 40 passed through the through holes 33 in the body 30 to make contact with. In the illustrated example, the inner wall surface of the recess 23 is formed in a substantially truncated conical shape made up of a sloped surface 232 tapered away from the upper surface 24 and a bottom surface 231 parallel to the upper surface 24. More specifically, the sloped surface 232 is formed as a curved surface that is curved such as to bulge toward the center axis of the recess 23. In the following description, the sloped surface 232 may be referred to as curved surface 232.

Figure 9:
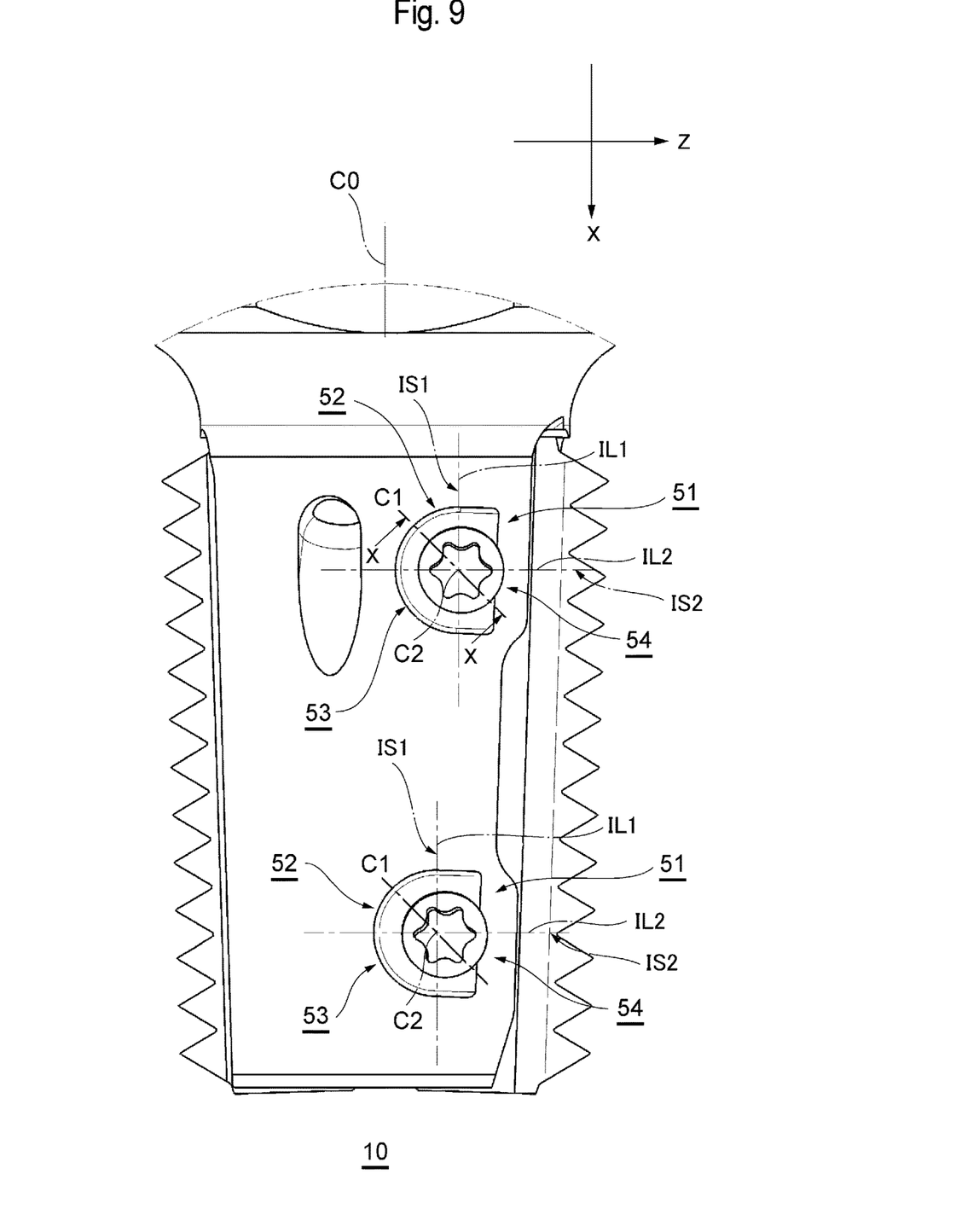
FIG. 9 is a plan view for explaining the inclining direction of the center axis line of the fastening member.

Next, the relationship between the recess 23 of the cutting insert 20 and the fastening screw 40 will be explained. FIG. 9 is a plan view of the cutting insert 20 in the X-Z plane, i.e., viewed from opposite the upper surface 24, wherein each of the recesses 23 is divided into four regions by an imaginary reference line IL1 parallel to the X axis and an imaginary reference line IL2 parallel to the Z axis. In the following description, for convenience, the positional relationship "as viewed from opposite the upper surface 24" may be referred to as the positional relationship "in plan view".

The four regions divided by the two imaginary reference lines IL1 and IL2 shall be called a first region 51, a second region 52, a third region 53, and a fourth region 54, from the top right in the drawing counterclockwise. That is, of the four discrete regions, the one located on the relatively peripheral side and on the relatively rear side shall be called a first region 51, the one that is located closer to the center than the first region 51 shall be called a second region 52, the one that is located closer to the distal side than the second region 52 shall be called a third region 53, and the one that is located closer to the peripheral side than the third region 53 shall be called a fourth region 54.

The first to fourth regions 51, 52, 53, and 54 mentioned above will be described further from a different viewpoint. A plane containing the center axis C2 of the recess 23 and parallel to the rotation axis C0 of the body 30 is defined as a first imaginary reference plane IS1. A plane containing the center axis C2 of the recess 23 and perpendicular to the rotation axis C0 of the body 30 is defined as a second imaginary reference plane IS2. The first imaginary reference line IL1 mentioned above is a line of intersection between the first imaginary reference plane IS1 and an imaginary plane IS0 (see FIG. 10) coplanar with the upper surface 24. The second imaginary reference line IL2 mentioned above is a line of intersection between the second imaginary reference plane 1S2 and the imaginary plane IS0.

When each of the recesses 23 is divided into four, first to fourth, regions 51, 52, 53, and 54 by the first and second imaginary reference planes IS1 and IS2, the region located on the center side closer to the rotation axis C0 of the body 30 and on the proximal side of the body 30 is the second region 52. Similarly, the region located on the peripheral side away from the rotation axis C0 of the body 30 and on the proximal side of the body 30 is the first region 51. The region located on the center side closer to the rotation axis C0 of the body 30 and on the distal side of the body 30 is the third region 53. The region located on the peripheral side away from the rotation axis C0 of the body 30 and on the distal side of the body 30 is the fourth region 54.

When the cutting insert 20 is set to the tip seat 311, all the fastening screws 40 make contact with the recesses 23 of the cutting insert 20 within the second region 52. The center axis line of the fastening screw 40 is inclined to the Y axis in a direction from the second region 52 toward the fourth region 54 diagonally opposite the second region 52, and downward from the second region 52 toward the fourth region 54. In other words, the center axis line C1 of the fastening screw 40 is inclined such that a head part 42 opposite from a distal end part (e.g., tapered surface 41) is located closer to the center side and to the proximal side of the body 30 than the distal end part.

Figure 10:
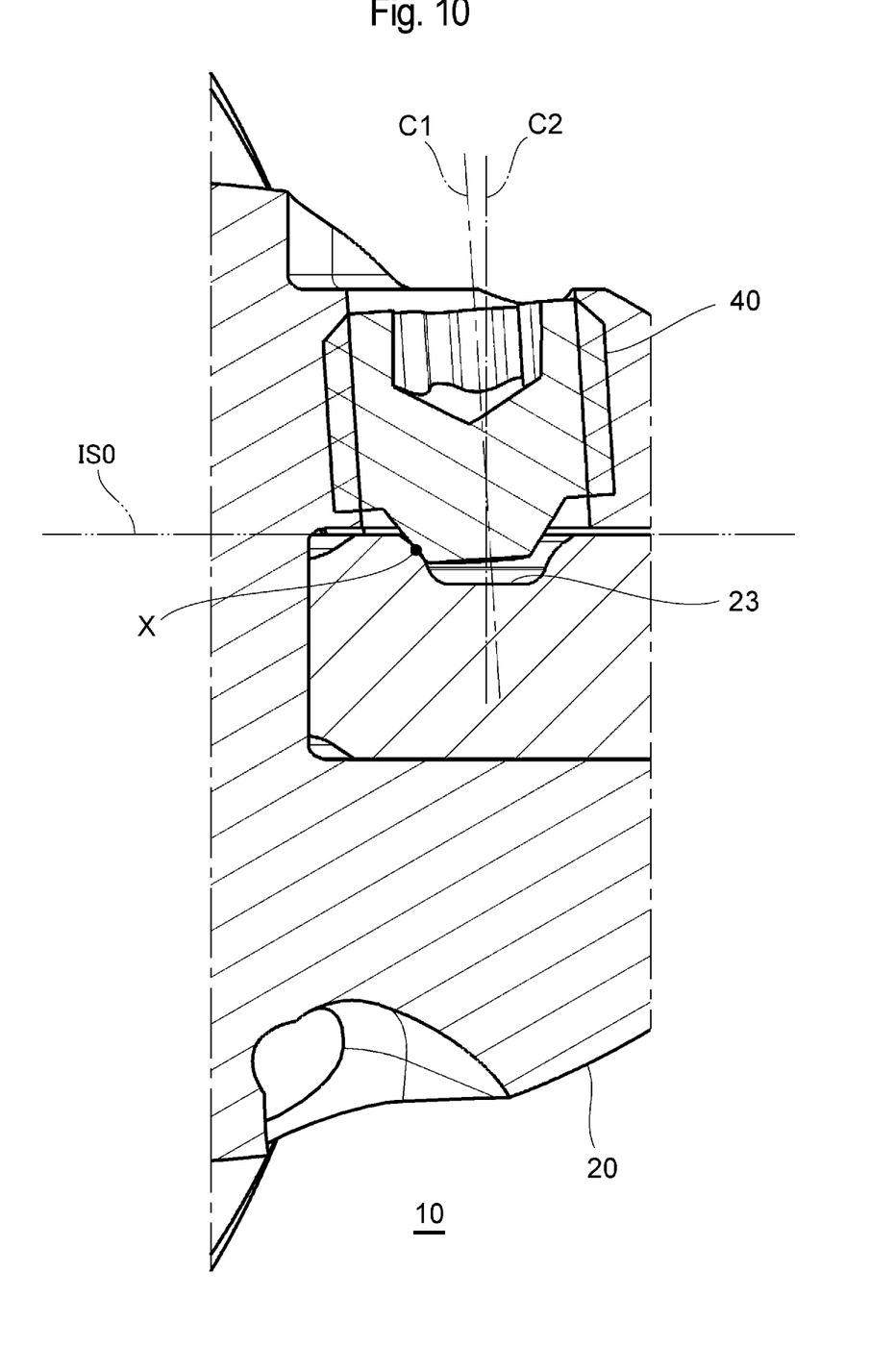
FIG. 10 is a cross-sectional view along the line X-X in FIG. 9.

FIG. 9 is a plan view for explaining the orientation of the center axis line C1 of the fastening screw 40, and FIG. 10 is a cross-sectional view along the line X-X of FIG. 9. As shown in FIG. 9, the center axis line C1 of the fastening screw 40 is inclined so that it extends over both of the second region 52 and the fourth region 54 when viewed in the X-Z plane. The center axis line C1 is inclined such that, as shown in FIG. 10, the part contained in the second region 52 is positioned above the part contained in the fourth region 54.

Figure 8A:
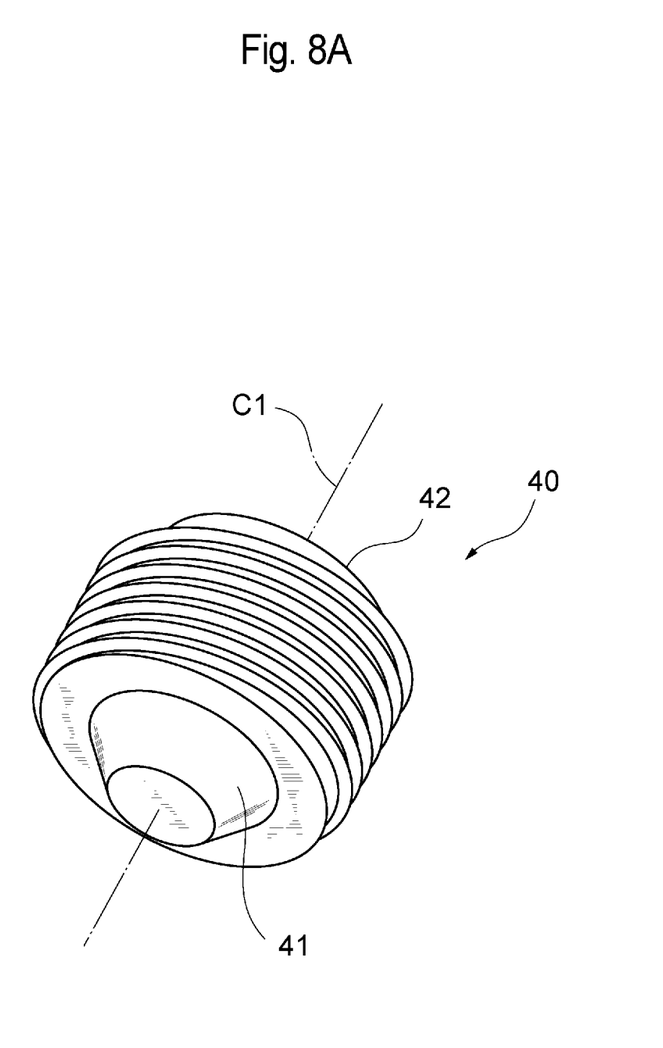
FIG. 8A is a perspective view of a fastening member according to this embodiment.
Figure 8B:
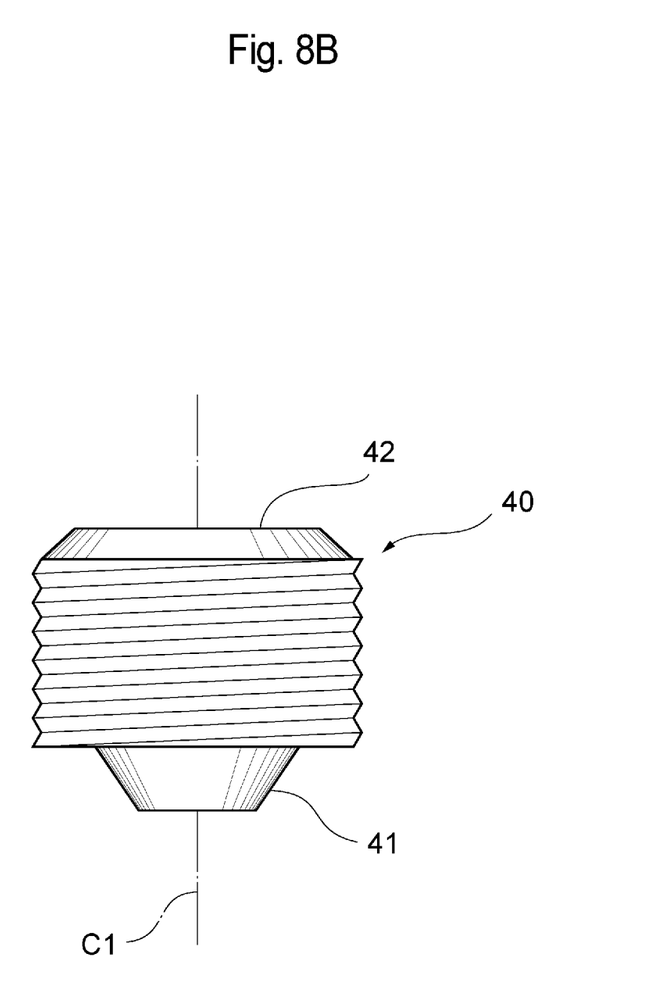
FIG. 8B is a front view of the fastening member according to this embodiment.

FIG. 8A is a perspective view of the fastening screw 40, and FIG. 8B is a front view of the fastening screw 40. As shown in FIG. 8A and FIG. 8B, the fastening screw 40 has a distal end part formed as a tapered surface 41 reducing radially toward the distal end. The tapered surface 41 abuts on the inner wall of the recess 23 of the cutting insert 20 when the cutting insert 20 is attached to the body 30.

In other words, the indexable cutting tool 10 includes the cutting inserts 20, the body 30 for holding the cutting inserts 20, and the fastening members (e.g., fastening screws 40) for securing the cutting inserts 20 to the body 30. Cutting edges 21 are formed in an intersecting edge portion where a longer one of the side edge portions (i.e., longer side 241) of the upper surface 24 of the cutting insert 20 and the side face 25 of the cutting insert 20 intersect. The cutting inserts 20 are set in the tip seats 311 and 312 with a U-shape cross section formed in the body 30. Recesses 23 with a bottom are formed in the upper surface 24 of the cutting insert 20. At least part of the inner wall surface (231, 232) of the recess 23 is a curved surface 232 convex toward the center axis C2 of the recess 23. A contact point X between the fastening member 40 and the recess 23 is located on the tapered surface 41. As viewed from opposite an imaginary plane IS0 (e.g., coplanar with the upper surface 24) containing edges of the recess 23, the recess 23 is divided into four regions (51, 52, 53, and 54) by a first imaginary reference line IL1 parallel to an imaginary line obtained by projecting the rotation axis C0 of the body 30 onto the imaginary plane IS0, and a second imaginary reference line IL2 perpendicular to the first imaginary reference line IL1. The contact point X between the recess 23 and the fastening member 40 is located within the second region 52 that is closer to the rotation axis C0 of the body 30 and to the proximal side of the body 30. The center axis line C1 of the fastening member 40 is inclined downward from the second region 52 toward the fourth region 54 that is diagonally opposite the second region 52.

Next, the effects achieved by the cutting tool 10 of this embodiment will be explained. The cutting insert 20 has cutting edges 21 in a shape corresponding to the features of internal threads or the like, so that internal threads and the like can be formed by a milling process. Since the cutting tool 10 has two cutting inserts 20, the processing can be performed with good efficiency.

Since the contact point X between the fastening screw 40 and the recess 23 of the cutting insert 20 is located within the second region 52 of the recess 23, the fastening screw 40 can apply a force to the cutting insert 20 in a direction toward the circumferential restricting wall 311b and the axial restricting wall 311c. As a result, the force is efficiently applied to the cutting insert 20, and it is stably clamped, as its movement is restricted in two directions. Moreover, the fastening screw 40 and the recess 23 are brought into contact with each other on the tapered surface 41 of the fastening screw 40 and on the curved inner wall of the recess 23, so that they can reliably make contact with each other.

Since the center axis line C1 of the fastening screw 40 is inclined downward from the second region 52 toward the fourth region 54, the head part 42 of the fastening screw 40 can hardly intersect the rotation trajectory of the cutting edges. Generally, the head part 42 of a fastening screw inserted in a dead end hole (recess with a bottom) cannot be set fully inside the hole so that, depending on the shape of the cutting insert 20 or how it is disposed, the protruding head part 42 of the fastening screw may sometimes overlap the rotation trajectory of the cutting edges 21. In the cutting tool 10, however, since the center axis line C1 of the fastening screw 40 is inclined to the Y axis, the head part 42 of the fastening screw 40 can reliably avoid the rotation trajectory of the cutting edges 21.

Figure 11:
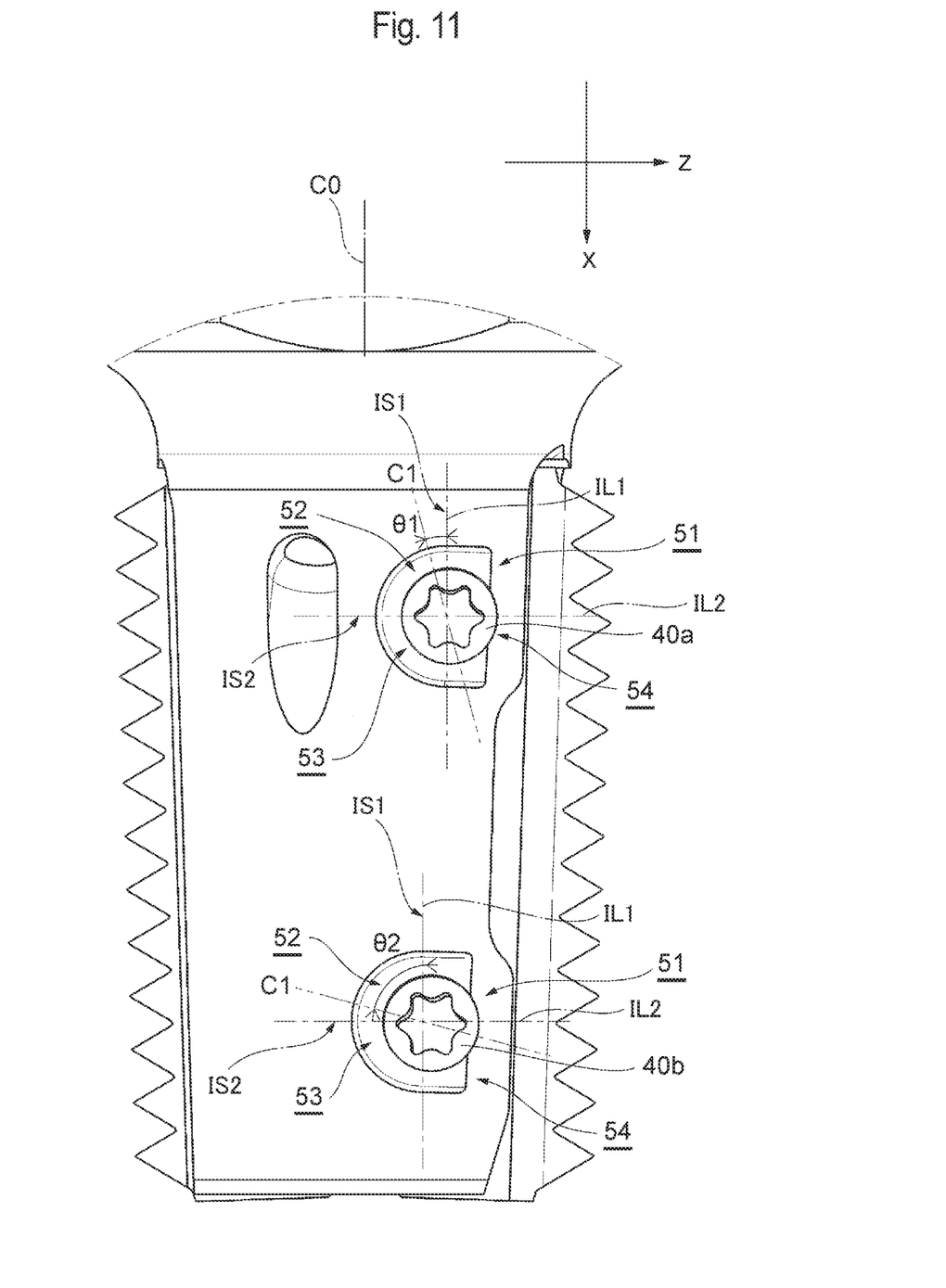
FIG. 11 is a plan view for explaining the inclining direction of the center axis line of the fastening member in a variation example of the embodiment shown in FIG. 9.

The means to displace the head part 42 of the fastening screw 40 from the rotation trajectory of the cutting edges 21 is not limited to the example shown in FIG. 9. In another embodiment, for example, as shown in FIG. 11, the center axis line of a fastening screw 40a located on the rear side may be inclined in a direction closer to parallel with the imaginary line Il1, while the center axis line of a fastening screw 40b located on the distal side may be inclined in a direction closer to parallel with the imaginary line IL2. In other words, the angle θ1 made by the center axis line C1 of the fastening screw 40a and the imaginary line IL1 may be made smaller than the angle θ2 made by the center axis line C1 of the fastening screw 40b and the imaginary line ILL By making the directions of inclination of the center axis lines of the fastening screws 40a and 40b different from each other so as to displace the contact points inside the second region, the cutting insert 20 can be clamped more stably.

Optionally, three or more fastening screws 40 may be used. In this case, the center axis line of a rearmost fastening member 40 may be inclined in a different direction from that of the center axis line of a frontmost fastening member 40, as described above.

The distal end face of the fastening screw 40 should preferably not be brought into contact with the bottom of the recess 23 of the cutting insert 20. A force applied to the bottom of the recess 23 may cause the cutting insert 20 to rotate around this portion as the pivot point, which will lift up the lower surface 22 from the bottom surface 311a or 312a of the tip seat and diminish the clamping force.

While one embodiment of the present invention has been described above as one example, the present invention is not limited to the embodiment described above. For example, while the cutting edges 21 of the cutting insert 20 of the embodiment described above have a shape corresponding to the features of internal threads or the like for cutting internal or external threads, the cutting edge of the cutting insert in the present invention is not limited to thread-cutting purposes. For example, the cutting insert may have a straight cutting edge such as that for shoulder milling.

While the upper surface 24 of the cutting insert 20 is parallel to the X-Z plane in this embodiment, these planes may not necessarily be parallel to each other. In this case, the recess may be divided into four regions by a line obtained by projecting the rotation axis of the body onto a plane containing edges of the recess of the cutting insert, and a line perpendicular to this line. In this case, too, the fastening screw 40 and the recess 23 make contact with each other in the second region.

While the cutting insert 20 in the embodiment described above is formed in such a shape that only the upper surface 24 does not serve as a rake surface, the cutting tool 10 of the present invention is not limited to this design. The cutting tool may be configured to use a cutting insert with both of the upper surface 24 and lower surface 22 serving as a rake surface so that two surfaces can be cut at once.

What is claimed is:

1. An indexable cutting tool comprising a body rotatable around a rotation axis, an exchangeable cutting insert attached to the body, and a fastening member that fixes the cutting insert to the body,
    the fastening member having a distal end part formed with a radially reducing tapered surface,
    the cutting insert including an upper surface and a lower surface, each formed in a rectangular shape with a pair of longer sides and a pair of shorter sides, and a side surface connecting the upper surface and the lower surface,
    a cutting edge being formed in an intersecting edge portion where the upper surface and the side surface intersect along the longer side,
    the upper surface being formed with a recess having a bottom,
    at least part of an inner wall surface of the recess being a curved surface bulged toward a center axis of the recess,
    given that a plane including the center axis of the recess and parallel to the rotation axis of the body is taken as a first imaginary reference plane, and
    a plane including the center axis of the recess and perpendicular to the rotation axis of the body is taken as a second imaginary reference plane,
    the recess, when divided into four, a first, a second, a third, and a fourth, regions by the first imaginary reference plane and the second imaginary reference plane having the second region located on a center side closer to the rotation axis of the body and on a proximal side of the body in the recess,
    the tapered surface of the fastening member making contact with the curved surface within the second region, and
    the fastening member having a center axis line inclined in such a direction that the center axis at a head part of the fastening member opposite from the distal end part of the fastening member is located closer to the center side and the proximal side of the body than the distal end part of the fastening member.

2. The indexable cutting tool according to claim 1, wherein
    the recess having a bottom includes a plurality of recesses, each having a bottom, formed on the upper surface of the cutting insert,
    the fastening member includes a first fastening member and a second fastening member, and
    a center axis line of the first fastening member when inserted in a first recess of the plurality of recesses closest to a proximal end of the cutting insert makes an angle with the first imaginary reference plane that is smaller than an angle made by a center axis line of the second fastening member and the first imaginary reference plane when the second fastening member is inserted in a second recess of the plurality of recesses closest to a distal end of the cutting insert.

3. The indexable cutting tool according to claim 2, wherein
    the cutting edge is a cutting edge for cutting threads.

4. The indexable cutting tool according to claim 1, wherein
    the cutting edge is a cutting edge for cutting threads.

* * * * *